United States Patent [19]
Loiseau

[11] 3,773,379

[45] Nov. 20, 1973

[54] FOLDING COVER FOR PICKUP TRUCK

[76] Inventor: William C. Loiseau, Mobile Estates Lot 25, Watertown, S. Dak.

[22] Filed: Aug. 31, 1972

[21] Appl. No.: 285,512

[52] U.S. Cl................ 296/107, 296/100, 135/4 A
[51] Int. Cl............................................. B60j 7/12
[58] Field of Search.................. 296/107, 100, 108, 296/109, 114, 118; 135/4 R, 4 A, 6 R

[56] References Cited
UNITED STATES PATENTS
3,688,787  9/1972  Feather............................ 296/100
3,201,171  8/1965  Wickard........................... 296/100

OTHER PUBLICATIONS
Boat Camping for the Sportsman, Clinton R. Hull, June, 1957 pp. 185–187.

*Primary Examiner*—Philip Goodman
*Assistant Examiner*—John A. Carroll
*Attorney*—Axel A. Hofgren et al.

[57] ABSTRACT

A folding cover structure for the cargo body of a pickup truck has a wooden base with side members which overlie the cargo body sidewalls and a front cross member behind the cab. Front and rear frames having side bars and cross bars are pivoted on the base side members for fore-and-aft swinging movement between oppositely upwardly inclined erected positions, a loading position with the rear frame leaning against the front frame, and a folded position with both frames lying on the forward part of the base. A fabric cover in the erected position of the frames has a top panel about coplanar with the top of the cab, a depending front panel the lower margin of which is secured to the front cross member, and depending side and rear panels that lash down with ropes. The cover folds with the frames.

15 Claims, 5 Drawing Figures

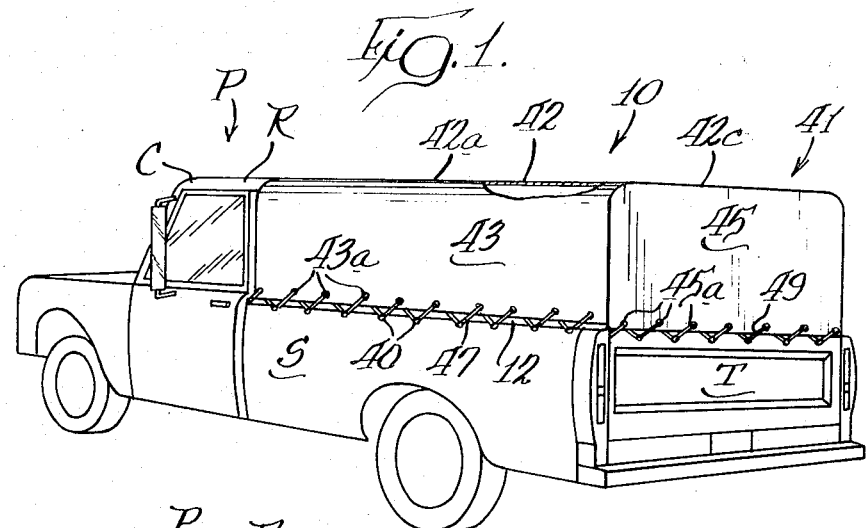
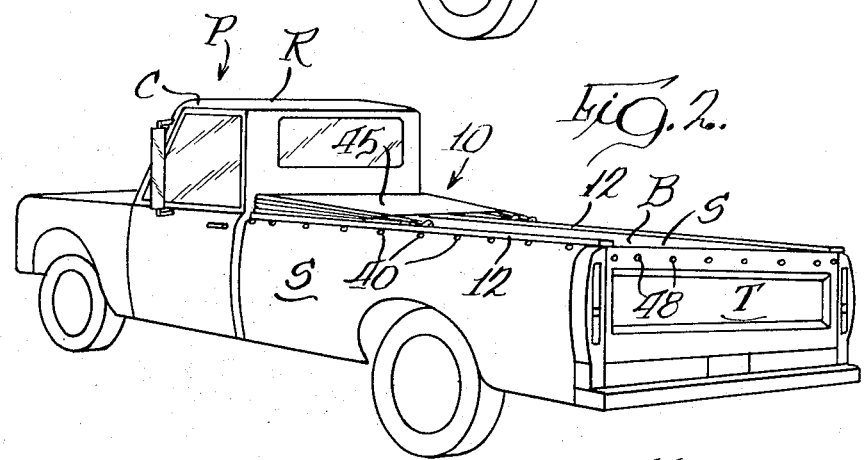
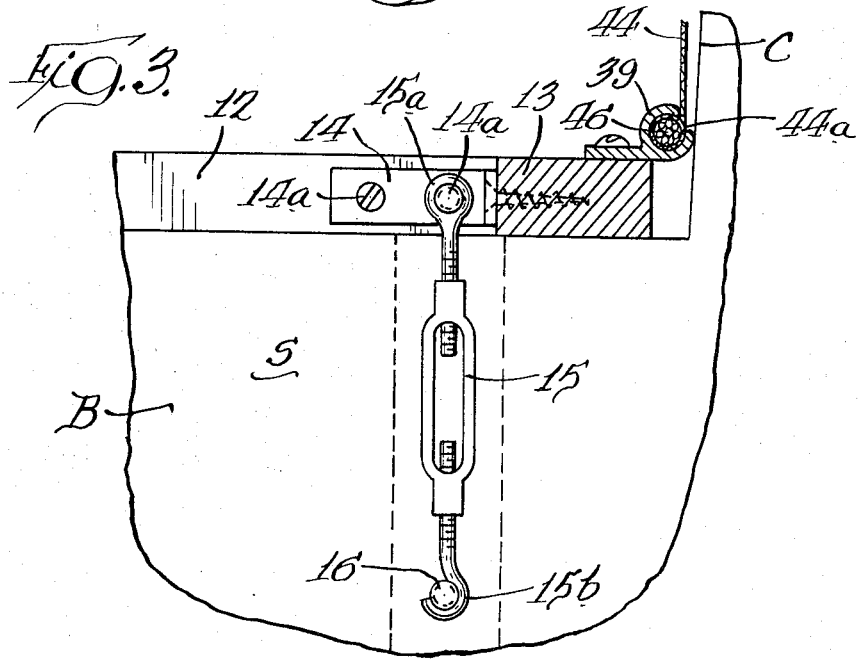

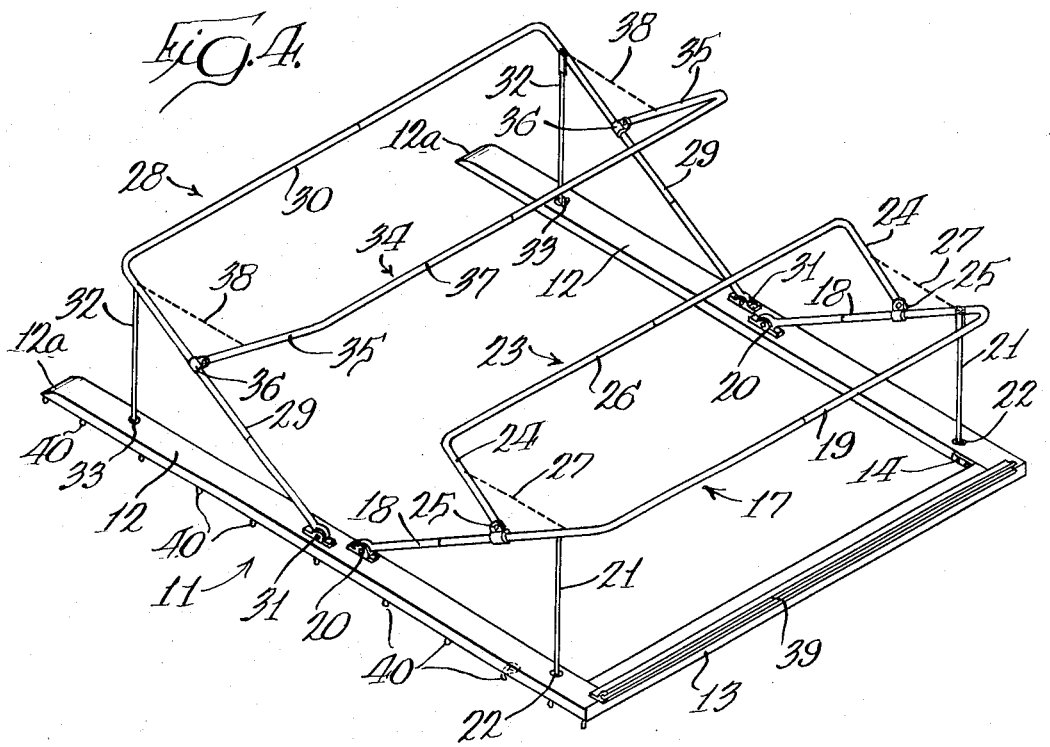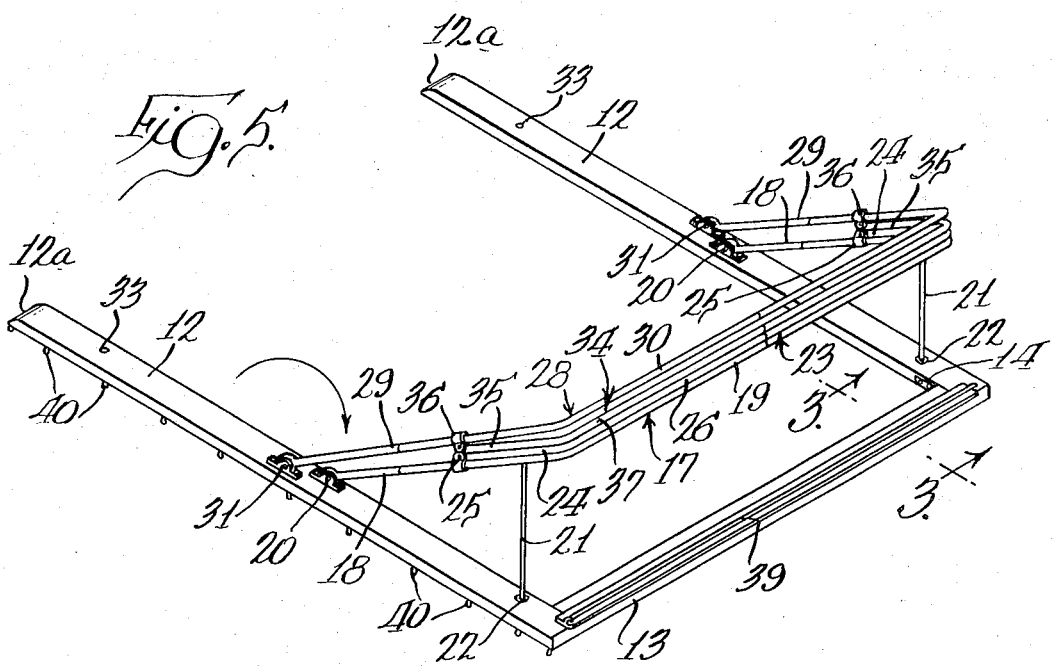

FOLDING COVER FOR PICKUP TRUCK

BACKGROUND OF THE INVENTION

Many varieties of covers have been devised for the cargo bodies of pickup trucks, but prior to the present invention there have been none known to applicant which is easy to mount on the truck body, affords substantial cargo space above the sidewalls of the truck body, and which can be readily manipulated for loading the truck.

In addition to the foregoing shortcomings of prior art covers for pickup truck bodies, there are many situations in which a pickup truck is to be used for a tall load, such as a refrigerator, which cannot be placed under any ordinary truck cover, so the cover must be completely removed from the truck to handle such a load.

SUMMARY OF THE INVENTION

The principal object of the present invention is to provide an improved cover for the cargo body of a pickup truck.

Another object of the invention is to provide a cover which, when in erected position, affords a covered cargo area which is the full height of the space behind the truck cab.

Yet another object of the invention is to provide a pickup truck cover which may be easily mounted on the truck and secured to the cargo body solely by means of adjustable fastening members that connect to the inner sides of the cargo body sidewalls.

Yet another object of the invention is to provide a truck cover so constructed that the rear half may be swung forward against the front half for easy loading, and in which both halves may be lowered into a collapsed position overlying the forward portion of the sidewalls so that about the rear three-quarters of the cargo body is unobstructed.

THE DRAWINGS

FIG. 1 is a perspective view of a pickup truck equipped with the cover structure of the present invention which is illustrated in its erected position with a part broken away;

FIG. 2 is a view similar to FIG. 1 with the cover folded;

FIG. 3 is a fragmentary longitudinal sectional view illustrating the attachment of the truck cover base to the cargo body and of the front of the fabric cover to the front of the base;

FIG. 4 is a perspective view of the base and framework of the truck cover with the framework in its erected position; and FIG. 5 is a view similar to FIG. 4 with the rear frame swung forward to a loading position.

DETAILED DESCRIPTION OF THE INVENTION

Referring to the drawings in greater detail, a pickup truck, indicated generally at P, includes a cab C and a cargo body B which has sidewalls S and a tailgate T. Mounted on the cargo body B is the truck cover of the present invention, indicated generally at 10.

Referring now particularly to FIGS. 3–5, the cover structure 10 includes a base, indicated generally at 11, which consists of wooden side members 12, the front ends of which are connected by a wooden cross member 13 which is seen in FIG. 3 to be positioned immediately behind the cab when the cover structure is mounted on the truck. The base may be fabricated of two-by-fours, and has right angle corner connectors 14 at its inside front corners.

The base 11 is mounted with its side members 12 on top of the cargo body sidewalls S, and it is secured to the truck body by adjustable means which, in the illustrated embodiment, consist of turnbuckles 15. The turnbuckles have eyes 15a at their upper ends which are impaled by screws 14a that secure the corner brackets 14 to the side members 12, and at the lower ends of the turnbuckles are open hooks 15b which engage studs 16 on the inside of the cargo body sidewalls S.

A front frame, indicated generally at 17, consists of side bars 18 and a front cross bar 19 connecting the free ends of the side bars; and aligned pivot bosses 20 which are mounted on the side members 12 approximately at the transverse median line of the base provide a pivotal mounting for the front frame 17. Pivoted on the front frame sidebars 18 near their forward ends are struts 21 which are adapted to occupy an upright position with their lower ends removably received in sockets 22 near the front of the base side members as seen in FIGS. 4 and 5. This is the erected position of the front frame 17, in which it is inclined upwardly and forwardly and the front crossbar is substantially coplanar with the roof R of the cab C as is clear from the erected truck cover structure 10 seen in FIG. 1.

A front intermediate frame, indicated generally at 23, has side arms 24 that are pivoted at 25 on the front side bars 18, and a front intermediate cross arm 26 which connects the free ends of the arms 24. Tension members 27, which may conveniently be short lengths of chain, connect the side arms 24 of the intermediate front frame to parts of the side bars 18 close to their forward ends, and the length of the tension members 27 is such that, as seen in the erected position of FIG. 4, the front intermediate cross arm 26 is substantially coplanar with the front crossbar 19.

By lifting the struts 21 from the sockets 22, the front frame 17 may be lowered into a folded position lying on the base 11, and the front intermediate frame may be swung forwardly to lie on the side bars 18 and front crossbar 19.

A rear frame, indicated generally at 28, has side bars 29 the free ends of which are connected by a rear cross bar 30 and the rear side bars 29 are pivoted at 31 in pivot bosses which are mounted on the base side members 12 immediately to the rear of the front frame bosses 20. Rear struts 32 are pivotally connected adjacent the rear ends of the rear frame side bars 29 and their free ends seat in sockets 33 in the base side members 12 near the rear ends 12a of said side members. In their upright positions, the struts 32 support the rear frame 28 in an upwardly and rearwardly inclined position in which the rear cross bar 30 is above the rear ends 12a of the base side members 12 and effectively coplanar with the front cross bar 19 and the front intermediate cross arm 26.

A rear intermediate frame, indicated generally at 34, includes side arms 35 which are pivoted at 36 on the rear side bars 29, and the free ends of the rear intermediate side arms 35 are connected by a rear intermediate cross arm 37. Tension members 38 are connected between the outer ends of the rear frame side bars 29 and the rear intermediate frame side arms 35. The length of the tension members 38 is such that in the erected position of FIG. 4 the rear intermediate cross arm 37 is substantially coplanar with the two cross bars 19 and 30 and the cross arm 26.

As seen in FIG. 5, although the rear frame pivots are spaced more widely than the front frame pivots 20, the frames 28 and 17 and the intermediate frames 23 and 34 are all the same width, so that in an inclined loading position the other three frames rest upon the front frame 17 with the intermediate frames 23 and 34 folded between the front frame 17 and the rear frame 28. In this position the rear struts 32 are seen to hang loosely inside the frames.

In the folded position of the cover frame illustrated in FIG. 2, the front struts 21 are removed from the sockets 22 and the front frame 17 is lowered to its folded position with the other three frames still supported upon the front frame.

The frame members may be any sufficiently strong and rigid solid or tubular metal stock.

Secured to the front cross member 13 of the base 11 is an extruded, forwardly open channel member 39, the shape of which is best seen in FIG. 3. Along the outer margins of both of the frame side members 12 and hooks 40 which are positioned laterally outwardly of the cargo body sidewalls S when the cover structure 10 is mounted on the cargo body B.

The extruded channel 39 and the hooks 40 are both part of the means for fastening down a cover, indicated generally at 41, which is fabricated of limp material such as heavy sheet plastic or woven fabric. The cover 41 includes a top panel 42 which overlies the front and rear frame means 17 and 28, depending side panels such as the panel 43 seen in FIG. 1, which are connected to opposite longitudinal margins 42a of the top panel and hang outside the front and rear frame side bars 18 and 29 when the frames are in their erected positions, a front panel 44 which is connected to the transverse front margin 42b of the top panel and hangs ahead of the front cross bar 19 when that cross bar is in its erected position, and a rear panel 45 which is connected to the transverse rear margin 42c of the top panel 42 and hangs behind the rear cross bar 30 in the erected position of the latter. As seen in FIG. 1, the rear panel 45 is directly above the tailgate T of the truck when the cover structure 10 is erected.

Means for securing the cover 41 in place is seen in FIG. 3 to include a rope 46 which is stitched into a tubular seam 44a formed in the lower margin of the front panel 44. In mounting the cover 41, the lower marginal portion of the front panel, containing the rope 46, is fed into the channel member 39 from one end, so that the rope and the lower marginal portion of the front panel are entrapped in the channel member.

Along the lower marginal portions of the side panels 43 are holes protected by grommets 43a, and when the cover 41 is in place, each of the grommets is substantially aligned with one of the hooks 40 in the lower surfaces of the base side members 12. Lashing means in the form of a rope 47 is laced through the grommets 43a and under the hooks 40 to secure the side panels 43 to the side frame members 12.

Grommets 45a are spaced along a lower marginal portion of the rear panel 45 in alignment with hooks 48 which are mounted adjacent the upper edge of the truck tailgate T, and when the cover 41 is in erected position, the grommets are generally aligned with the hooks 48 so that a shock cord 49 of elastic material may be laced through the grommets 45a and under the hooks 49. If the truck tailgate T is of the type which extends across the rear ends of the cargo body sidewalls S, then the shock cord 49 has its ends looped onto the two outermost hooks 48 on the tailgate. On the other hand, if the tailgate is of the type which closes between the sidewalls S, there are hooks 48 on the rear ends of the sidewalls onto which the two ends of the shock cord 49 are looped.

When the cover structure 10 is to be moved from the erected position of FIGS. 1 and 4 to the loading position of FIG. 5, the two ends of the shock cord are unhooked and the cord is freed from the hooks 48; and the ropes 47 are disconnected at their rear ends and loosened sufficiently to be freed from the hooks 40. By grasping the rear frame cross bar 30 and lifting it, the struts 32 are disengaged from their sockets 33, and the rear frame 28 may then be walked forward to swing it to the position of FIG. 5 where it rests upon the front frame 17. After the rear frame 28 swings past the vertical and starts to move downwardly onto the front frame 17, the rear intermediate frame 34 swings into the folded position of FIG. 5, and the front intermediate frame is manually moved to that position. As this is done, the loose fabric of the top panel 42 may be manually folded between the cross bars and the loose fabric of the side panels 43 may be folded between the rear side frame bars 29 and the rear side frame arms 35, between said arms 35 and the front side frame arms 24, and between said arms 24 and the front side frame bars 18.

To move the cover structure 10 to the folded position of FIG. 2, it is necessary either to get into the cargo body or to reach under the detached front portion of the side panels 43 to disengage the front struts 21 from the sockets 22 and swing them inwardly so that the entire frame may be lowered to its folded position. Any suitable means (not shown) may be used to securely fasten the folded cover structure in the position of FIG. 2. Conveniently, a rope or shock cord may be hooked around the more forwardly positioned hooks 40 at the front ends of the base side members 12 to tie down the folded cover structure.

The foregoing detailed description is given for clearness of understanding only and no unnecessary limitations should be understood therefrom, as modifications will be obvious to those skilled in the art.

I claim:

1. A folding cover structure for a pick-up truck which has a cab and a cargo body behind the cab, the body having side walls and a tailgate, said structure comprising, in combination:

a front frame including a pair of parallel front side bars connected by a front cross bar, said front side bars being pivotally supported on the cargo body side walls near the transverse center line of the body so that said front frame is swingable between 1. a forwardly and upwardly inclined erected position in which the front cross bar is above the front end portion of the body, and 2. a folded position lying on the sidewalls;

movable front struts for supporting the front frame in erected position;

a rear frame including a pair of parallel rear side bars connected by a rear cross bar, said rear side bars being pivotally supported on the cargo body side walls immediately behind the front frame pivots so that said rear frame is swingable between
1. a rearwardly and upwardly inclined erected position in which the rear cross bar is above the rear end portion of the body and substantially coplanar with the front cross bar,
2. a loading position leaning against the erected front frame, and
3. a folded position lying on the folded front frame;
movable rear struts for supporting the rear frame in erected position;
a cover of limp sheet material which has
1. a top panel overlying the front and rear frame means,
2. depending side panels which are connected to opposite longitudinal margins of the top panel and hang outside the front and rear frame side bars when the frames are in their erected positions, and
3. depending front and rear panels which are connected to the transverse margins of the top panel and hang, respectively, ahead of and behind the front cross bar and the rear cross bar when said cross bars are in their erected positions,
said cover having portions folded between parts of the front and rear frames in the loading position and in the folded position of said frames;
and means for securing said side panels relative to the truck side walls, said front panel relative to the front portion of the cargo body and said rear panel relative to the tailgate.

2. The structure of claim 1 which includes a rear intermediate frame having side arms pivoted on the rear side bars near the midpoints of the latter, and a rear intermediate cross arm integral with the free ends of the rear side arms, said rear intermediate frame occupying a forwardly inclined erected position with its arms generally perpendicular to the rear side bars and the cross arm generally coplanar with the rear and front cross bars,
and tension means connecting said rear side arms to the rear side bars so that the former may occupy a folded position resting on the latter.

3. The structure of claim 2 which includes a front intermediate frame having side arms pivoted on the front side bars near the midpoints of the latter, and a front intermediate cross arm integral with the free ends of the front side arms, said front intermediate frame occupying a rearwardly inclined erected position with its arms generally perpendicular to the front side bars and the cross arm generally coplanar with the front and rear cross bars,
and tension means connecting said front side arms to the front side bars so that the former may occupy a folded position resting on the latter.

4. The structure of claim 1 which includes a front intermediate frame having side arms pivoted on the front side bars near the midpoints of the latter, and a front intermediate cross arm integral with the free ends of the front side arms, said front intermediate frame occupying a rearwardly inclined erected position with its arms generally perpendicular to the front side bars and the cross arm generally coplanar with the front and rear cross bars,
and tension means connecting said front side arms to the front side bars so that the former may occupy a folded position resting on the latter.

5. The structure of claim 1 in which the rear struts and the front struts are pivoted on the side bars and seat in sockets.

6. The structure of claim 1 in which the cross bars in their erected positions are substantially coplanar with the top of the cab.

7. The structure of claim 1 which includes a base frame having side members that overlie the cargo body walls and a cross member connecting the front ends of the side members, and means securing said base frame to the cargo body.

8. The structure of claim 7 in which the means for securing the front panel includes a forwardly open channel member supporting the cross member, the lower marginal portion of the front panel is received in said channel, and a rope extends from end to end of the channel to retain said lower marginal portion in the channel.

9. The structure of claim 8 in which the cover fastening means includes ropes laced through grommets on the cover side panels and around hooks beneath the base frame side members.

10. The structure of claim 7 in which the cover fastening means includes ropes laced through grommets on the cover side panels and around hooks beneath the base frame side members.

11. The structure of claim 1 in which the cover fastening means includes an electric cord laced through grommets in the cover back panel and around hooks on the tailgate.

12. A folding cover structure for a pick-up truck which has a cab and a cargo body behind the cab, the body having side walls and a tailgate, said structure comprising, in combination:
a base frame having side members that overlie the cargo body side walls and a cross member that connects the front ends of the side members immediately behind the cab;
adjustable securing means connected to the front of the base frame and adapted to be connected to inner portions of the cargo body side walls;
a front frame including a pair of parallel front side bars connected by a front cross bar, said front side bars being pivotally mounted on the base frame side members near the transverse center line of the body so that said front frame is swingable between
1. a forwardly and uwpardly inclined erected position in which the front cross bar is above the front end portion of the body, and
2. a folded position lying on the side walls;
movable front struts for supporting the front frame in erected position;
a rear frame including a pair of parallel rear side bars connected by a rear cross bar, said rear side bars being mounted on the base frame side members immediately behind the front frame pivots so that said rear frame is swingable between
1. a rearwardly and upwardly inclined erected position in which the rear cross bar is above the rear end portion of the body and substantially coplanar with the front cross bar,
2. a loading position leaning against the erected front frame, and
3. a folded position lying on the folded front frame;
movable rear strut for supporting the rear frame in erected position;
a cover of limp sheet material which has 1. a top panel overlying the front and rear frame means,
2. depending side panels which are connected to opposite longitudinal margins of the top panel and hang outside the front and rear frame side bars when the frames are in their erected positions, and
3. depending front and rear panels which are connected to the transverse margins of the top panel and hang, respectively, ahead of and behind the front cross bar and the rear cross bar when said cross bars are in their erected positions, said cover having portions folded between parts of the front and rear frames in the loading position and in the folded position of said frames;

means securing the lower margin of the front panel to the base frame cross member; and lashing means detachably securing the lower margins of the side panels to the base frame side members.

13. The structure of claim 12 in which the means securing the lower margin of the front panel includes a rope secured along said margin, and a forwardly open channel member on the base frame cross member in which said rope is entrapped.

14. The structure of claim 13 that includes grommets in the lower portions of the side panels, hooks on the base side members, and a rope laced through the grommets and engaging the hooks on each side.

15. The structure of claim 14 that includes grommets in the lower portion of the back panel, and an elastic cord adapted to be laced through said grommets and under hooks on the truck tailgate.

* * * * *